United States Patent
Lindgren (10) Patent No.: US 8,160,578 B2
(45) Date of Patent: Apr. 17, 2012

(54) IP MULTIMEDIA SUBSYSTEM ACCESS METHOD AND APPARATUS

(75) Inventor: Hans Lindgren, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1114 days.

(21) Appl. No.: 11/654,695

(22) Filed: Jan. 18, 2007

(65) Prior Publication Data

US 2007/0195805 A1 Aug. 23, 2007

Related U.S. Application Data

(63) Continuation-in-part of application No. PCT/EP2005/055248, filed on Oct. 13, 2005.

(30) Foreign Application Priority Data

Oct. 27, 2004 (GB) .................................. 0423845.7

(51) Int. Cl.
 *H04W 4/18* (2009.01)
 *H04L 12/66* (2006.01)
 *G06F 15/16* (2006.01)

(52) U.S. Cl. ............ 455/432.2; 370/466; 370/352; 370/356; 709/227

(58) Field of Classification Search ............ 455/435.1, 455/403, 432.1–432.2; 370/352, 356, 466–469; 709/227
See application file for complete search history.

(56) References Cited

U.S. PATENT DOCUMENTS

| | | | | |
|---|---|---|---|---|
| 3,750,107 A | * | 7/1973 | Pyne ............................ | 370/465 |
| 6,591,116 B1 | * | 7/2003 | Laurila et al. ................. | 455/558 |
| 6,788,676 B2 | * | 9/2004 | Partanen et al. ............... | 370/352 |
| 6,917,612 B2 | * | 7/2005 | Foti et al. ...................... | 370/352 |
| 7,643,474 B2 | * | 1/2010 | Huang .......................... | 370/352 |
| 7,792,974 B2 | * | 9/2010 | Westman et al. .............. | 709/228 |
| 7,881,338 B2 | * | 2/2011 | Damola et al. ................ | 370/466 |
| 2002/0141389 A1 | * | 10/2002 | Fangman et al. ............. | 370/352 |
| 2002/0165006 A1 | * | 11/2002 | Haller et al. .................. | 455/556 |
| 2003/0027569 A1 | * | 2/2003 | Ejzak ............................ | 455/432 |
| 2003/0200260 A1 | * | 10/2003 | Donovan et al. .............. | 709/203 |
| 2004/0053643 A1 | * | 3/2004 | Kimura ......................... | 455/558 |
| 2004/0085949 A1 | * | 5/2004 | Partanen et al. ............... | 370/352 |
| 2004/0122934 A1 | * | 6/2004 | Westman et al. ............. | 709/223 |
| 2004/0125756 A1 | * | 7/2004 | Lepore et al. ................. | 370/261 |
| 2004/0190498 A1 | * | 9/2004 | Kallio et al. .................. | 370/352 |

(Continued)

FOREIGN PATENT DOCUMENTS

EP 1 365 620 11/2003

(Continued)

OTHER PUBLICATIONS

Translation of Chinese official action, Nov. 6, 2009, in corresponding Chinese application No. 200580044954.

(Continued)

*Primary Examiner* — Matthew Sams
(74) *Attorney, Agent, or Firm* — Nixon & Vanderhye P.C.

(57) ABSTRACT

A method of facilitating access to IP Multimedia Subsystem, IMS, services by non-IMS enabled terminals. The method comprises registering a non-IMS enabled terminal with a Home IMS gateway, and, in response to said registration, performing an IMS registration on behalf of said terminal between the Home IMS gateway and the IMS using information obtained from an ISIM application present at the Home IMS gateway.

9 Claims, 8 Drawing Sheets

U.S. PATENT DOCUMENTS

| | | | |
|---|---|---|---|
| 2005/0021875 A1* | 1/2005 | Bouthemy et al. | 709/250 |
| 2005/0181872 A1* | 8/2005 | Acharya et al. | 463/35 |
| 2006/0009219 A1* | 1/2006 | Jaakkola et al. | 455/435.2 |
| 2006/0120362 A1* | 6/2006 | Westman et al. | 370/389 |
| 2006/0149847 A1* | 7/2006 | Meskauskas et al. | 709/229 |
| 2007/0156909 A1* | 7/2007 | Osborn et al. | 709/227 |
| 2007/0157022 A1* | 7/2007 | Blom et al. | 713/166 |
| 2011/0164608 A1* | 7/2011 | Lindgren | 370/352 |

FOREIGN PATENT DOCUMENTS

| | | |
|---|---|---|
| EP | 1 432 257 | 6/2004 |
| WO | 2004/091165 | 10/2004 |

OTHER PUBLICATIONS

International Search Report for PCT/EP2005/055248 mailed Feb. 28, 2006.

3GPP: "Access security for IP-based services (Release 6)", Technical Specification Group Services and System Aspects; 3G Security, Sep. 2004, XP002367996.

* cited by examiner

IP MULTIMEDIA SUBSYSTEM ACCESS METHOD AND APPARATUS

This application is a continuation-in-part application of international application PCT/EP2005/055248 filed 13 Oct. 2005, which designated the U.S. and claims priority to GB 0423845.7 filed 27 Oct. 2004, the entire content of each of which is hereby incorporated by reference.

TECHNICAL FIELD OF THE INVENTION

The present technology relates to an IP Multimedia Subsystem access method and apparatus and more particularly though not necessarily to such an apparatus method and apparatus suitable for accessing an IP Multimedia Subsystem from the home or a small office.

BACKGROUND

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

Figure 1:
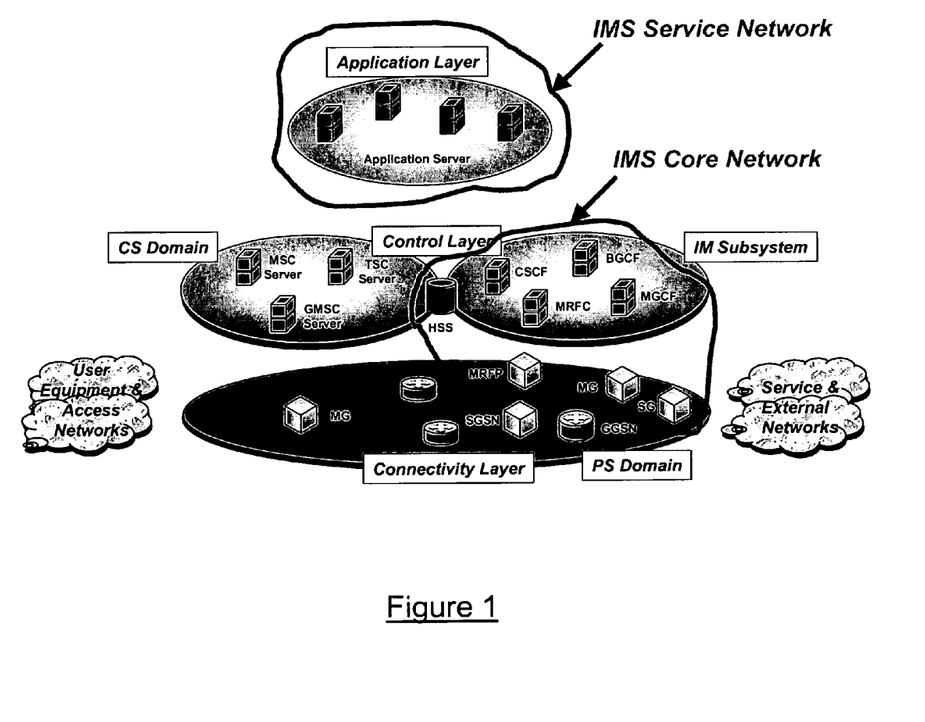
FIG. 1 illustrates schematically the IMS architecture within a 3G network.

IP Multimedia Subsystem (IMS) is the technology defined by the Third Generation Partnership Project (3GPP) to provide IP Multimedia services over 3G mobile communication networks (3GPP TS 23.228 and TS 24.229 Release 5 and Release 6). IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). The Session Description Protocol (SDP), carried by SIP signalling, is used to describe and negotiate the media components of the session. Others protocols are used for media transmission and control, such as Real-time Transport Protocol and Real-time Transport Control Protocol (RTP/RTCP), Message Session Relay Protocol (MSRP), Hyper Text Transfer Protocol (HTTP). IMS requires an access network which would typically be a 2G/3G General Packet Radio Service (GPRS)/Packet Switched (PS) network, but which might be some other access network such as fixed broadband or WiFi. FIG. 1 illustrates schematically how the IMS fits into the mobile network architecture in the case of a GPRS/PS access network.

The TISPAN working group of the European Telecommunications Standards Institute (ETSI) is currently working on a proposal for the Next Generation Network (NGN) for fixed networks based upon IMS. As part of this project, consideration will be given to a so-called Home IMS Gateway (HIG) which will allow non-IMS terminals to access IMS services. It is expected that the HIG will find applications in the home and small office environments where users might wish to access IMS services using a number of non-IMS enabled terminals which may or may not be SIP terminals. Examples of non-IMS but SIP enabled terminals are SIP telephones and PCs, whilst examples of non-IMS terminals which do not have SIP functionality are legacy telephones including DECT telephones. The HIG will include a SIP gateway in order to handle interoperability issues (e.g. conversion between SIP and other signalling protocols required by user equipment).

The current proposal for a HIG conflicts to some extent with the current access security requirements for IMS as defined in the 3GPP Technical Specification 33.203. These requirements specify that each terminal accessing the IMS have access to an IMS SIM (ISIM) application. The ISIM stores subscriber identity information, as well as other information required to authenticate a subscriber to a network operator and to authorise access to network enabled services. ISIM applications are provided on Universal Integrated Circuit Cards (analogous to today's GSM SIM cards). Of course, non IMS terminals such as legacy equipment will not have the necessary UICC card reader or IMS functionality.

SUMMARY

A solution to the problem of allowing non-IMS terminals to access IMS services and which meets the access security requirements is to allocate to each non-IMS terminal a UICC with ISIM application. A user must then insert into the HIG the UICC associated with a particular non-IMS terminal when he or she wishes to use that terminal to access an IMS service. This solution has obvious disadvantages in terms of flexibility, convenience, and cost. An alternative solution is to use a single UICC with ISIM to register multiple non-IMS terminals. Of course, rather than utilise an ISIM on a UICC, a soft ISIM may be used instead.

According to a first aspect of the present invention there is provided a method of facilitating access to IP Multimedia Subsystem, IMS, services by non-IMS enabled terminals, the method comprising:

registering a non-IMS enabled terminal with a Home IMS gateway; and in response to said registration, performing an IMS registration on behalf of said terminal between the Home IMS gateway and the IMS using an ISIM application present at the Home IMS gateway.

Example embodiments effectively delegate IMS registration to the Home IMS Gateway. It is thus not necessary that each terminal wishing to make use of IMS services has access to a UICC card storing a ISIM application or to a soft ISIM.

In certain example embodiments of the present invention, said ISIM present at the Home IMS gateway is provided on a Universal Integrated Circuit Card. In other embodiments, said ISIM is a soft ISIM, i.e. an ISIM function implemented in software and stored in a memory of the Home IMS gateway.

Preferably, the Home IMS Gateway comprises a SIP Back-to-Back User Agent having an interface to said ISIM. In the case where said non-IMS enabled terminal is a SIP terminal, registration of the terminal to the Home IMS Gateway comprises performing a SIP registration between the terminal and the SIP Back-to-Back User Agent. The terminal may inform the SIP Back-to-Back User Agent of a Public User Identity to be associated with the terminal. Alternatively, the terminal may provide a local identity which is mapped by the SIP Back-to-Back User Agent to a pre-stored Public User Identity. Said IMS registration comprises carrying out a SIP registration between the Back-to-Back User Agent and the IMS network, including notifying the IMS network of the Public User Identity associated with the terminal.

Where the non-IMS terminal is not a SIP terminal, the step of registering the terminal with the Home IMS Gateway may be carried out following initial connection of the terminal to the Gateway, e.g. involving detecting the creation of a loop.

For terminals already connected, registration may occur upon power-on of the HIG. The Gateway may have pre-stored therein a default Public User Identity which is allocated to non-SIP terminals and which is used when registering with the IMS. More preferably, registration is performed by a SIP Gateway having an interface to said ISIM on the UICC. The SIP Gateway performs protocol translation between SIP and protocols used by these non-SIP terminals.

According to a second aspect of the present invention there is provided a method of operating a Home IP Multimedia Subsystem Gateway to facilitate access to IP Multimedia Subsystem, IMS, services by non-IMS enabled terminals, the method comprising:

registering a non-IMS enabled terminal with the Home IMS gateway; and in response to said registration, obtaining information from an ISIM application present at the Home IMS gateway and performing an IMS registration on behalf of said terminal with this information.

According to a third aspect of the present invention there is provided a Home IP Multimedia Subsystem Gateway arranged in use to facilitate access to IP Multimedia Subsystem, IMS, services by non-IMS enabled terminals, the apparatus comprising:

at least one interface for coupling the Gateway to said non-IMS enabled terminals;

a memory storing an ISIM application or means for accessing an ISIM application;

first processing means for registering a non-IMS enabled terminal with the Gateway; and second processing means for registering a non-IMS enabled terminal, registered with the Gateway, with the IMS using said ISIM application.

The interface for coupling the Gateway to said non-IMS enabled terminals may be, for example, a line interface for coupling the gateway to legacy equipment such as a blackphone or DECT phone, or a LAN or WLAN interface.

The first and second processing means may comprise means for implementing a SIP Gateway which performs protocol translations between Session Initiation Protocol, SIP, used by the IMS and a protocol used by the non-IMS enabled terminals. For a non-SIP terminal, the SIP Gateway may register a default Public User Identity associated with the Private User Identity of the ISIM with the IMS.

The first and second processing means may comprise a SIP Back-to-Back User Agent which acts as a SIP server towards SIP terminals and as a SIP client towards the IMS. The SIP Back-to-Back User Agent may register a personal Public User Identity associated with the Private User Identity of the ISIM with the IMS.

DETAILED DESCRIPTION OF CERTAIN EXAMPLE EMBODIMENTS

Figure 2:
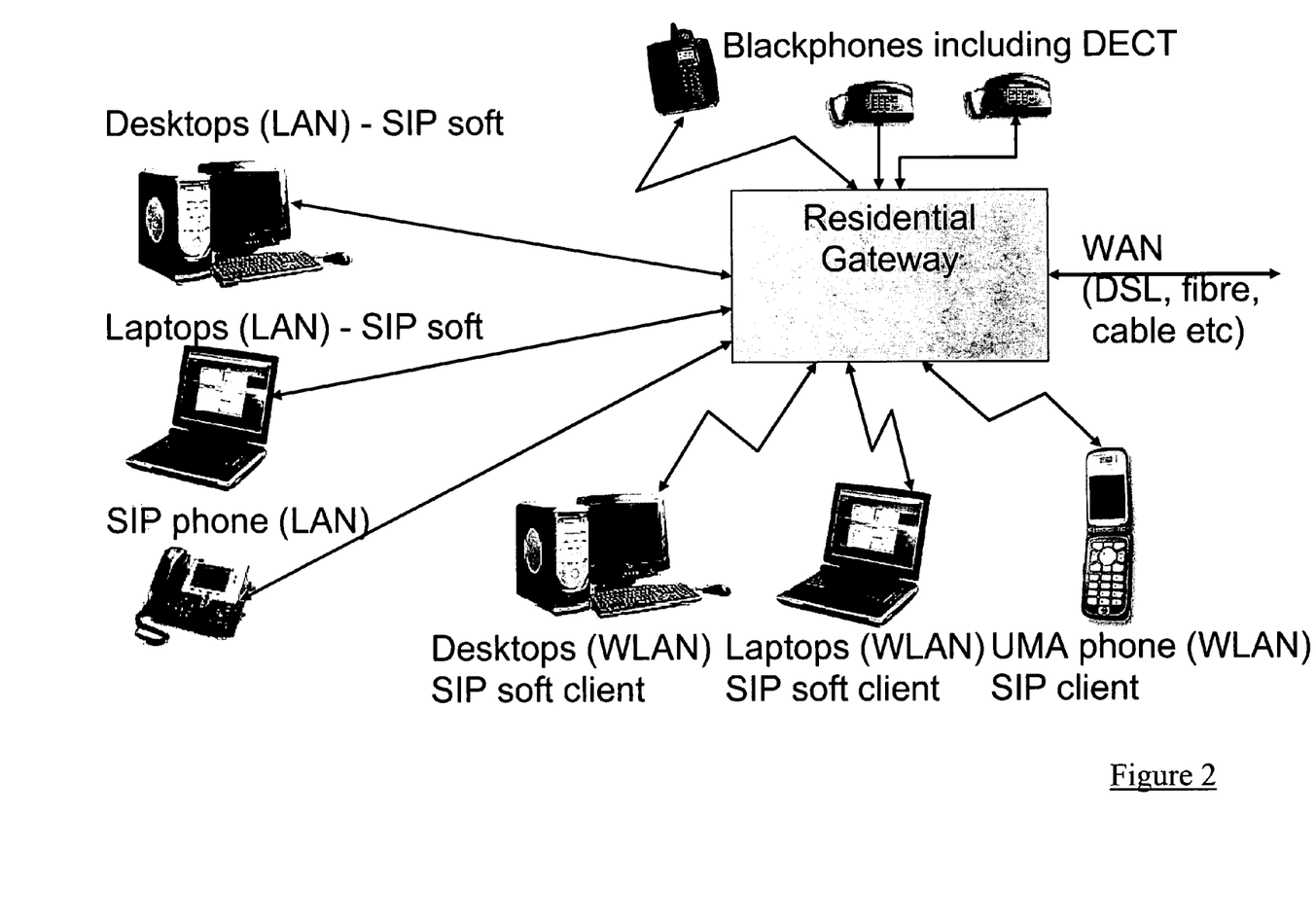
FIG. 2 illustrates schematically a Home IMS Gateway serving both IMS and non-IMS user equipment terminals.
Figure 3:
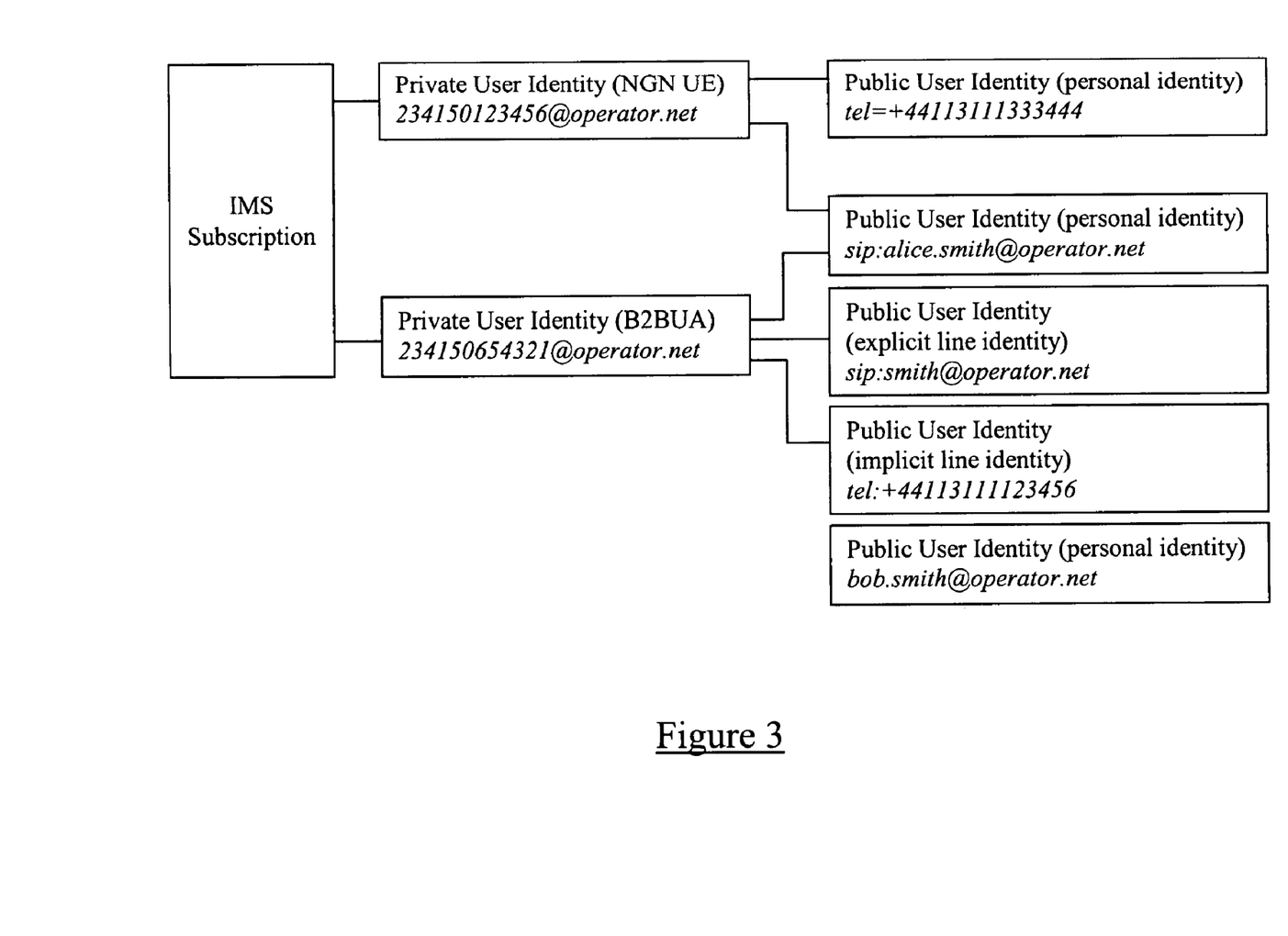
FIG. 3 illustrates schematically the architecture of a Home IMS gateway.

As has already been mentioned above, it is proposed to introduce a so-called Home IMS Gateway (HIG) into the general IMS architecture of FIG. 1. FIG. 2 illustrates a HIG (referred to in the Figure as a "Residential Gateway") located within a home or small business area and serving a number of terminals including both legacy equipment and SIP enabled terminals. FIG. 3 illustrates in detail the functional architecture of the HIG, together with the interfaces to various external user terminals. In particular, a Wide Area Network (WAN)/Local Area Network (LAN) interface is used to attach the HIG to the IMS.

Various legacy terminals which are not SIP terminals are attached to the HIP via a line interface which connects to a SIP gateway. Examples of legacy terminals are a DECT telephone and a conventional telephone ("blackphone"). The HIG includes a Session Initiation Protocol (SIP) gateway (implemented according to 3GPP TS 24.229 and IETF RFC 3261). The SIP gateway allows interworking between various client terminal signalling protocols and the SIP protocol used by the IMS. For example, the SIP gateway may provide translation between ISDN based signalling protocols used by a blackphone and SIP. The SIP Gateway is coupled to the WAN/LAN interface.

IMS enabled SIP terminals such as desktop and laptop PCs and SIP phones are attached to a Local Area Network (LAN) and/or a Wireless Local Area Network (WLAN) to which the HIG is also attached via LAN/WLAN interfaces. A Network Address Translation/Firewall layer is used to provide address mapping within the HIG. The NAT/FW layer is coupled to the WAN/LAN interface. These terminals each have their own UICCs storing respective ISIM applications.

Non-IMS enable SIP terminals which do not have access to ISIM applications are also attached to the HIG via the LAN/WAN and LAN/WAN interfaces of the HIG. For these terminals, access to IMS services is facilitated by a SIP Back-to-Back User Agent (B2BUA) with NAT/FW entities. A SIP B2BUA acts as a SIP server towards the user equipment and as a SIP client towards the IMS.

Both the SIP B2BUA and SIP gateway have an interface to an ISIM application stored on a UICC. This UICC may be removable from the HIG hardware or may be permanently secured to the HIG. The ISIM application is available to and valid for all non-ISIM terminals that are connected to the IMS via the HIG. Terminals which have access to their own ISIM application do not of course use the ISIM in the HIG, and only use the NAT/FW functions of the HIG as described above. It is noted that in the discussion which follows, all of the ISIM applications, i.e. that available to the HIG and those available to user equipment terminals, are associated by the IMS with a single subscription. It will also be appreciated that, rather than being stored on a UICC, the ISIM may be a software or "soft" ISIM.

Before considering further the operation of the HIG, the concepts of Private and Public User Identities will first be introduced. These are intrinsic to the operation of the IMS and are discussed in 3GPP TS 23.228 6.7.0. A Private User Identity is an identity which is "bound" to an ISIM and is used by the IMS to authenticate and authorise a subscriber. The Private User Identity is not normally disclosed to third parties and is somewhat analogous to the International Mobile Subscriber Identity (IMSI) used in GSM networks. A Public User Identity on the other hand is used to identify subscribers and/or their user equipment for the purpose of participating in IMS services, somewhat analogous to an email address or telephone number. A Public User Identity is used for example to identify the destination of an IMS service session request. A subscriber may have several Public User Identities associated with a single Private User Identity, whilst different Private User Identities associated with a given subscription may share a common Public User Identity. During IMS registration and assuming successful authentication, the IMS is notified of the Public User identities associated with a subscriber.

Figure 4:
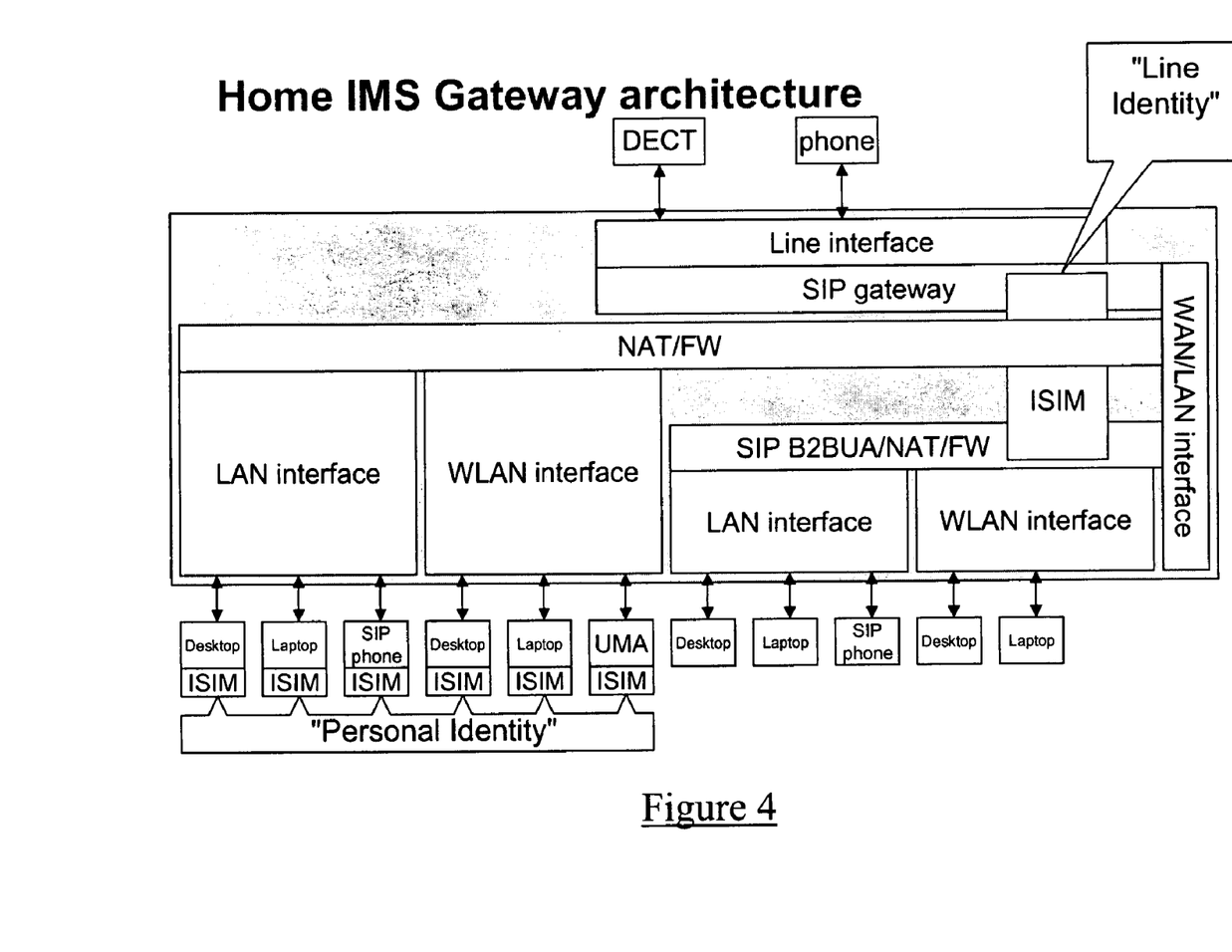
FIG. 4 illustrates schematically an example allocation of public and private user identities.

FIG. 4 illustrates a mapping of Public and Private User Identities which might be implemented using the HIG of FIG. 3. In this example there are two Private User Identities connected to the same IMS subscription: "234150123456@operator.net" is the Private User Identity in the ISIM in some SIP enabled user equipment terminal, and "234150654321@operator.net" is the Private User Identity in the ISIM of the HIG.

A default Public User Identity is associated with the subscriber and can be viewed as a group identity that identifies the family or small office that accesses the IMS via the HIG and which owns the subscription. The default Public User Identity is stored in the HIG, associated in the SIP B2BUA with only the Private User Identity 234150654321@operator.net of the ISIM within the HIG. At least all the non-SIP enabled terminals, i.e. those terminals which are incapable of notifying the HIG of associated Public User Identities, should be reachable by other third party IMS users when those users use the default public identity. In the example of FIG. 4, the default Public User Identity is smith@operator.net. This default Public User Identity can be associated with an implicit Public Identity in the form of an E.164 number, in this example "+44113111123456". The implicit line identity is configured in the network, and the B2BUA downloads this identity as part of the registration procedure.

The user (e.g. family member) Alice Smith wants to be contactable on two terminals, the user equipment terminal allocated the Private User Identity 234150123456@operator.net and a non-IMS home PC connected to the HIG which is SIP enabled. Within the IMS network therefore, Alice's Public User Identity "alice.smith@operator.net" must be associated with both Private User Identities. Alice has a further Public User Identity "alice@operator.net" which she gives out to only close family and friends. She wishes to be reachable at this personal identity only on her user equipment terminal. This identity is therefore only associated with the Private User Identity 234150123456@operator.net.

Alice's husband Bob wishes to be reachable only via his non-IMS, but SIP enabled laptop computer. Bob's Public User Identity "bob.smith@operator.net" is therefore associated within the IMS network only with the private user identity 234150654321@operator.net of the ISIM within the HIG.

The SIP user agents (UAs) in Bob and Alice's terminals register their personal identities associated with the Private User Identities at the IMS network, via the SIP B2BUA in the HIG. As already noted, the default Public User Identity is also associated with the Private User Identities is also registered at the IMS network. The default identity may be registered before or after registration of the personal identities.

Figure 5:
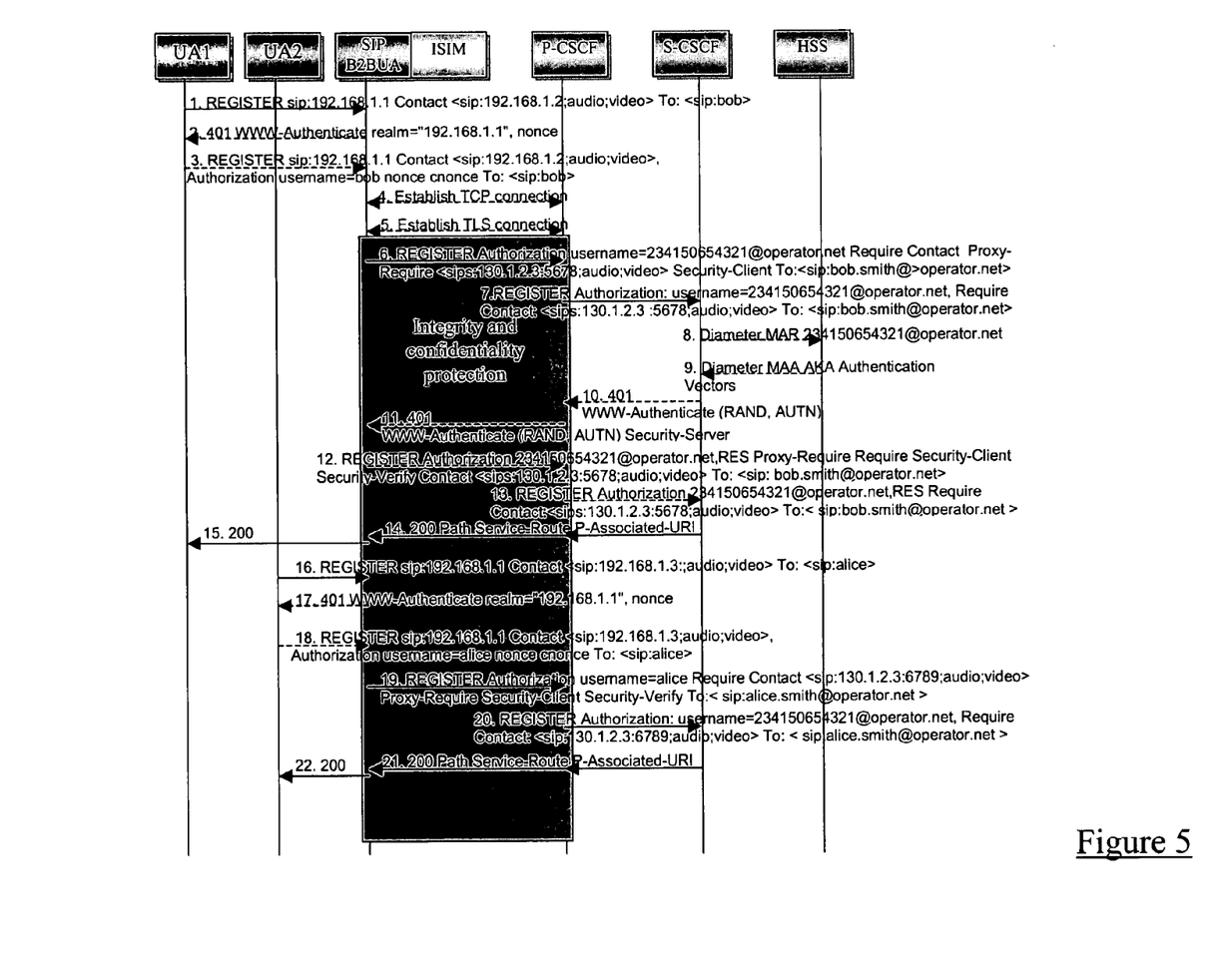
FIG. 5 is a signalling diagram showing signalling associated with the IMS registration of SIP enabled user equipment via the gateway of FIG. 3.

FIG. 5 shows the signalling associated with registering a pair of SIP enabled but non-IMS terminals, UA1 and UA2,
with the B2BUA of the HIG, and with the subsequent authorisation procedures between the B2BUA and the IMS. Illustrated in the Figure are the Proxy Call State Control Function (P-CSCF) and Serving Call State Control Function (S-CSCF) nodes of the IMS network, as well as a Home Subscriber Subsystem (HSS) which belongs to the network operator and which contains subscription and access data. The signalling procedure is based on 3GPP TS24.229 and TS24.228.

1. The UA1 registers with the SIP B2BUA of the HIG with a "To" header including a local username ("bob") that is associated with the subscription for the ISIM.
2. The B2BUA optionally challenges the user. The subscriber can locally configure whether or not local users should be challenged and set the passwords to use for the local users.
3. The UA1 resends the register message if challenged. The message then contains an "Authorization" header including the identity (bob) of the challenged user included in the username parameter.
4. The SIP B2BUA establishes a TCP connection (typically to port 5061) with the P-CSCF.
5. The SIP B2BUA establishes a TLS connection with a TLS handshake. The TLS handshake may resume an existing TLS session. IPsec as currently defined in 3GPP is not an option since it does not traverse a NAT. Therefore TLS is used in this example.
6. The B2BUA uses the Private User Identity (234150654321@operator.net) stored in the HIG ISIM as the username. The Contact header contains the IP address (or domain name) of the B2BUA. Typically this IP address is assigned with the Dynamic Host Control Protocol (DHCP). The address or name of the P-CSCF is also assigned with DHCP. The selected Public User Identity in the To header is the value in the To header sent from the UA1 or a mapped name (i.e. bob.smith@operator.net) where a local username used by the UA1 is mapped to a Public User Identity by the HIG. The subscriber can locally configure any such mapping.
7. The P-CSCF sends the request to the S-CSCF after excluding some headers (Proxy-Require and Security-Client) and some header information (e.g. sec-agree from the Require header).
8. The S-CSCF requests authentication vectors from the HSS where the client must be authenticated and there are no authentication vectors already present (for this subscription) at the S-CSCF. Typically, a subscription context is created for each subscription in the S-CSCF, and following an initial registration for that subscription a flag of the context is switched from a "not-authenticated" to an "authenticated" state.
9. The HSS returns one or several authentication vectors to the S-CSCF.
10. The S-CSCF challenges the B2BUA/ISIM with a SIP 401 message including RAND and AUTN in case client authentication is necessary.
11. The P-CSCF adds some headers to the 401 message before sending it to the B2BUA.
12. The B2BUA calculates a RES and verifies the AUTN if challenged by a 401. The B2BUA then sends a new REGISTER including an Authorization header with the digest where RES has been used as the shared key.
13. The P-CSCF sends the request to the S-CSCF after excluding some headers (Proxy-Require, Security-Verify and Security-Client) and some header information (e.g. sec-agree from the Require header). The S-CSCF verifies the digest based on RES from the B2BUA with the digest calculated with XRES. This is only necessary if the B2BUA has been challenged.
14. The S-CSCF responds with a SIP 200 message including Path, Service-Route and P-Associated-URI headers.
15. The B2BUA stores the content of the Service-Route and P-Associated-URI headers and then removes the Path, Service-Route and P-Associated-URI headers before sending a 200 message to the UA1.

This completes the registration procedure for the UA1.

16. The UA2 registers to the SIP B2BUA with a To header including a local username ("alice") that is associated with the subscription for the ISIM.
17. The B2BUA optionally challenges the user.
18. The UA2 resends the register message if challenged. The message then contains an Authorization header including the identity (alice) of the challenged user included in the username parameter.
19. The B2BUA uses the Private User Identity (234150654321@operator.net) stored in the ISIM as the username. The selected Public User Identity in the To header is the mapped name (alice.smith@operator.net).
20. The P-CSCF sends the request to the S-CSCF after excluding some headers (Proxy-Require, Security-Verify and Security-Client) and some header information (e.g. sec-agree from the Require header).
21. Since the S-CSCF has already authenticated the Private User Identity (there is a service context) there is no need to do this again.
22. The S-CSCF responds with a SIP 200 message including Path, Service-Route and P-Associated-URI headers.
23. The B2BUA stores the content of the Service-Route and P-Associated-URI headers and then removes the Path, Service-Route and P-Associated-URI headers before sending a 200 message to the UA1.

The terminal UA2 is now registered with the IMS.

Figure 6:
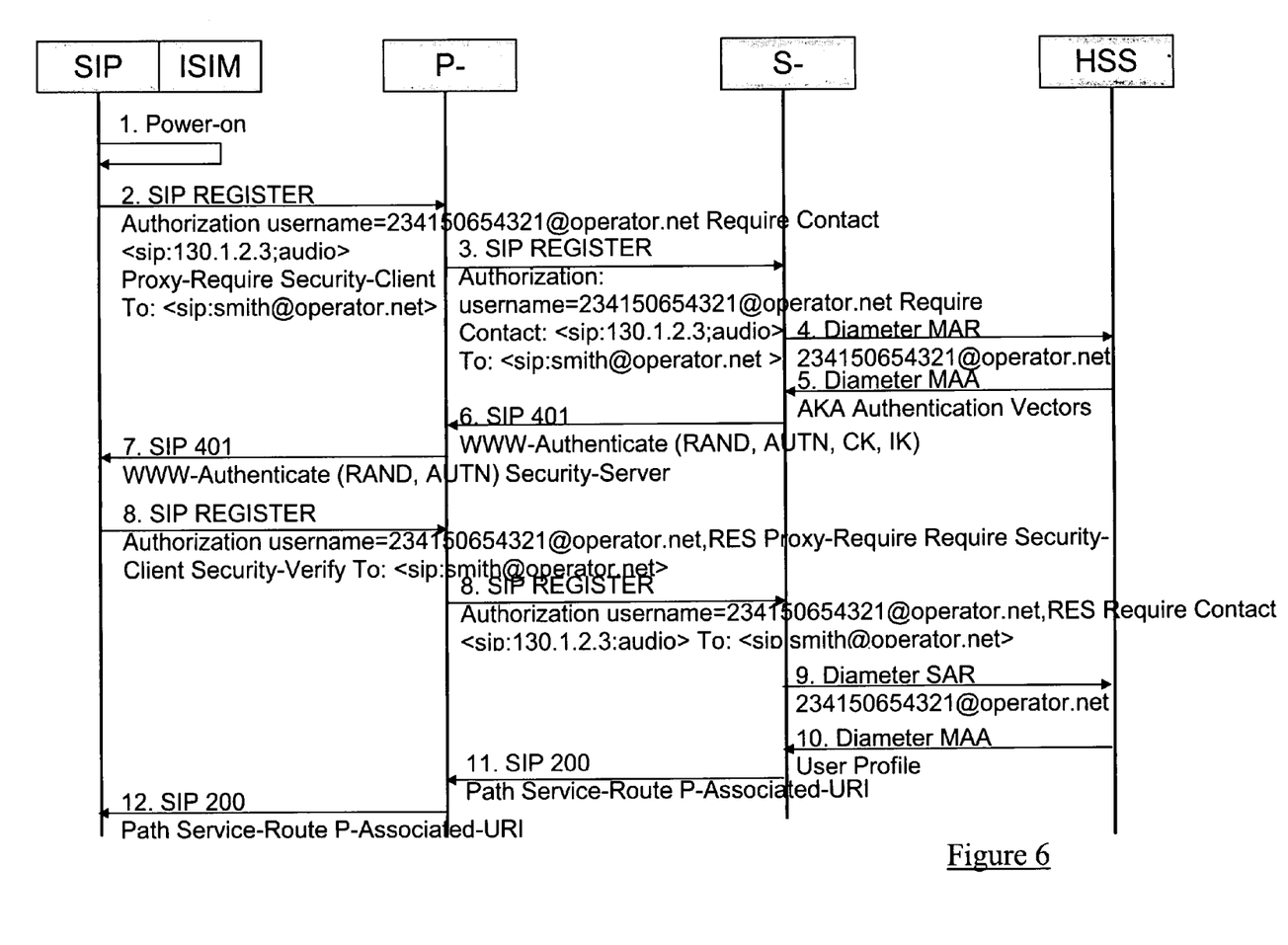
FIG. 6 is a signalling diagram showing signalling associated with the IMS registration of legacy user equipment via the gateway of FIG. 3.

FIG. 6 illustrates signalling associated with the registration of a legacy telephone or "blackphone". As the blackphone is not a SIP terminal, registration of the terminal with the HIG is effected by the SIP gateway following power-on of the HIG (or connection of the blackphone to the HIG). For the Public User Identity in the To header of the REGISTER message, the HIG selects the default Public User Identity, i.e. smith@operator.net (FIG. 6).

Figure 7:
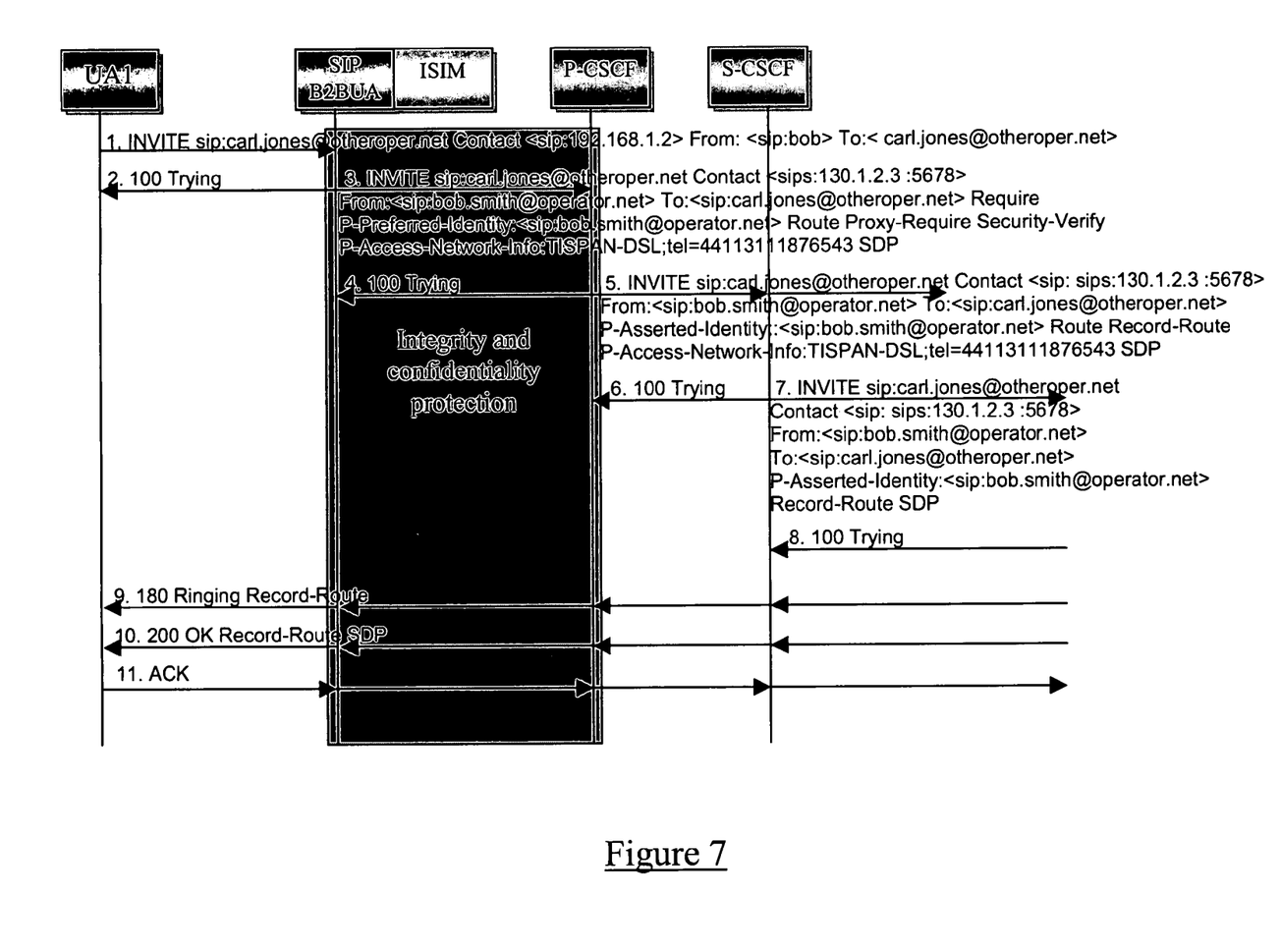
FIG. 7 is a signalling diagram showing signalling associated with the setting up of an IMS session originated by user equipment behind the gateway of FIG. 3.

Considering again the SIP enabled terminal scenario, FIG. 7 illustrates the signalling associated with IMS session establishment, where the session is originated the UA1 behind the HIG. The signalling steps are as follows:

1. The UA1 sends a SIP INVITE to the B2BUA.
2. The B2BUA responds with a 100 Trying.
3. The B2BUA adds some headers to the INVITE message. The From header is converted to the Public User Identity that is equal to the personal identity for the user. The P-Preferred-Identity header also contains the personal identity. The P-Access-Network-Info contains the access name. In some cases this is not known by the application, in which case it might be added somewhere in the access network or configured by the subscriber. The telephone number can be added based on the line identity stored on the ISIM. The B2BUA changes the Contact header and sends the INVITE to the P-CSCF.
4. 100 Trying.
5. The P-CSCF removes the P-Preferred-Identity and inserts instead a P-Asserted-Identity that contains the content of P-Preferred-Identity if that was authorized from the network point of view. The P-CSCF then sends the INVITE to the S-CSCF.
6. 100 Trying
7. The S-CSCF removes the P-Access-Network-Info before the INVITE is sent out from the network.
8. 100 Trying.
9. The other party sends a 180 Ringing.
10. The other party sends a 200 OK.
11. The UA1 acknowledges the 200 OK with an ACK.

Figure 8:
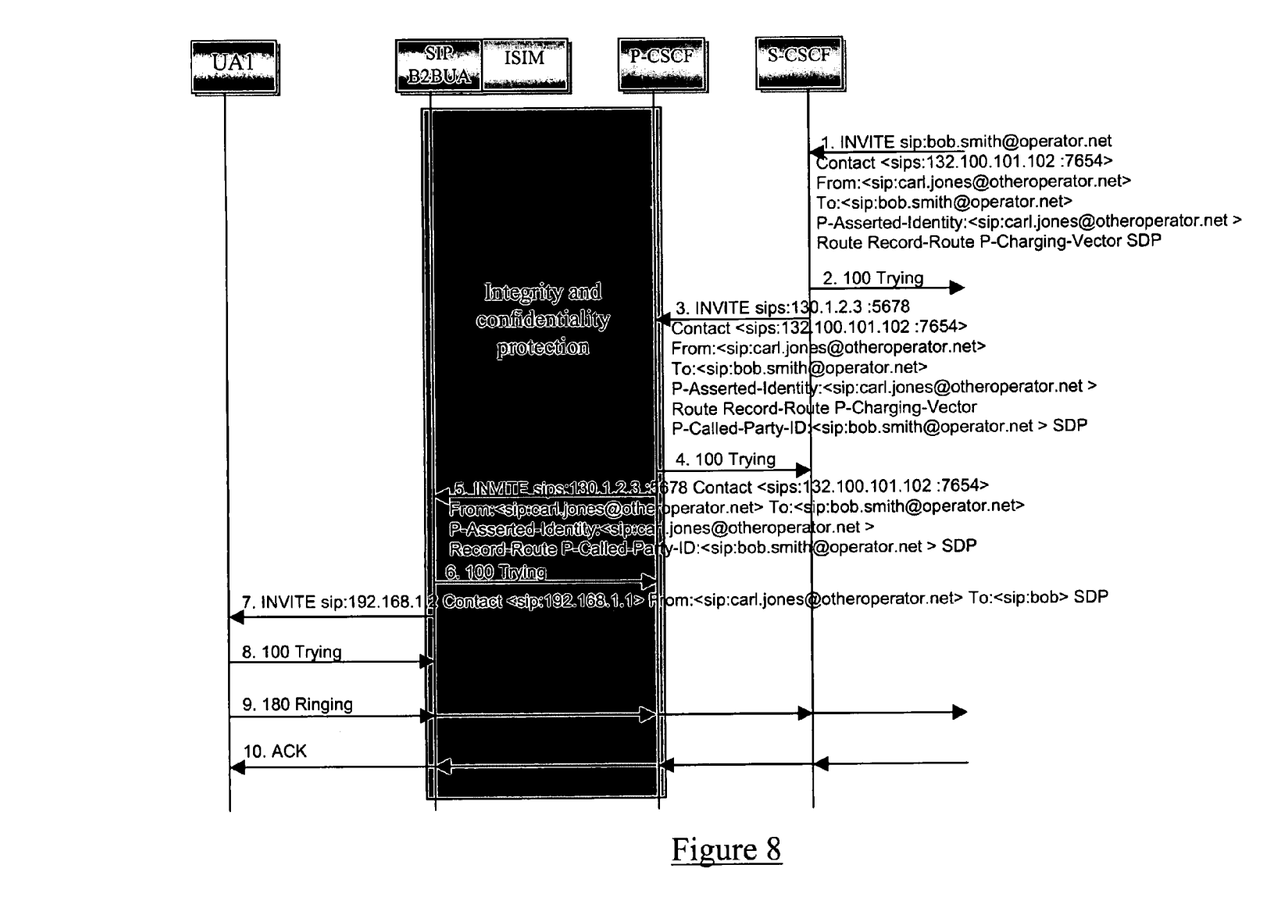
FIG. 8 is a signalling diagram showing signalling associated with the setting up of an IMS session terminated by user equipment behind the gateway of FIG. 3.

FIG. 8 illustrates the signalling associated with the establishment of an IMS session, where the UA1 terminates the session. The signalling steps are as follows:

1. The remote UA sends a SIP INVITE to the S-CSCF.
2. The S-CSCF responds with 100 Trying.
3. The S-CSCF picks the contact address stored at registration and inserts it as the Request-URI. The S-CSCF inserts the original Request-URI into the P-Called-Party-ID header and sends the INVITE to the P-CSCF.
4. The P-CSCF responds with 100 Trying.
5. The P-CSCF removes the P-Charging-Vector and sends the INVITE to the B2BUA.
6. The B2BUA responds with 100 Trying.
7. The B2BUA removes the P-Asserted-Identity (a possibility is that the content in the From header is replaced by the content in the P-Asserted-Identity). The Record-Route headers are removed. A possibility is that the B2BUA uses the content of the P-Called-Party-ID to replace the To content. The B2BUA uses the Request-URI in the received request to find the home user that has previously registered. The Request-URI is replaced with the locally stored contact address. The B2BUA sends the INVITE to the UA1.
8. The UA1 responds with 100 Trying.
9. The UA1 responds with 180 Trying.
10. The remote UA sends an ACK to the UA1 via the S-CSCF and P-CSCF.

A number of significant advantages arise from the implementation of the procedures described above. In particular, only one ISIM is needed for several users. This reduces the cost and increases the flexibility of the system whilst still takes advantage of the increased security provided by a UICC. Other advantages are:

The terminals that have no ISIM take advantage of the protected tunnel from the HIG and the perimeter protection with NAT and the firewall in the HIG.

The operator does not need to provide and maintain any passwords. Local passwords are up to the subscriber to define.

It is still possible to use personal identifications when mapping the local personal identity used by a PC in non-IMS SIP, to a specific Public User Identity in the IMS network.

It will be appreciated by the person of skill in the art that various modifications may be made to the above described non-limiting, example embodiments without departing from the scope of the present claims.

The invention claimed is:

1. A method of operating a Home IP Multimedia Subsystem Gateway to facilitate access to IP Multimedia Subsystem (IMS) services by non-IMS enabled, non-Session Initiation Protocol (SIP) user equipments, the method comprising:

registering a non-IMS enabled, non-SIP user equipment with the Home IMS Gateway, this registration being performed by a SIP Gateway present at the Home IMS Gateway and having an interface to an IMS Subscriber Identity Module (ISIM) application also present at the Home IMS Gateway; and in response to said registration, obtaining information from the ISIM application present at the Home IMS Gateway and performing an IMS registration on behalf of said non-IMS enabled, non-SIP user equipment with this information and a pre-stored default Public User Identity.

2. A method according to claim 1, the Home IMS Gateway comprising a Session Initiation Protocol (SIP) Back-to-Back User Agent having an interface to said ISIM application.

3. A method according to claim 1, wherein the step of registering the user equipment with the Home IMS Gateway comprises detecting a loop on the user equipment input line of the user equipment.

4. A method according to claim 1, wherein said ISIM application is stored on a Universal Mobile Telecommunications System (UMTS) Integrated Circuit Card.

5. A method according to claim 1, wherein said ISIM application is a soft ISIM and is stored in a memory of the Home IMS gateway.

6. A Home IP Multimedia Subsystem Gateway arranged in use to facilitate access to IP Multimedia Subsystem (IMS) services by non-IMS enabled, non-Session Initiation Protocol (SIP) user equipments, the apparatus comprising:
   at least one interface configured to couple the Home IMS Gateway to said non-IMS enabled, non-SIP user equipments;
   a memory configured to store an IMS Subscriber Identity Module (ISIM) application or electronic circuitry configured to access an ISIM application;
   a memory configured to store a default Public User Identity;
   processing circuitry configured to:
      implement a SIP Gateway which performs protocol translations between SIP used by the IMS and a protocol used by the non-IMS enabled, non-SIP user equipments;
      register a non-IMS enabled, non-SIP user equipment with the Home IMS Gateway; and
      register a non-IMS enabled, non-SIP user equipment registered with the Home IMS Gateway with the IMS using said ISIM application and the default Public User Identity.

7. A Home IMS Gateway according to claim 6, wherein the interface for coupling the Home IMS Gateway to said non-IMS enabled user equipments is a line interface for coupling the Home IMS gateway to legacy equipment, or a Local Area Network (LAN) or Wide Local Area Network (WLAN) interface.

8. A Home IMS Gateway according to claim 6, wherein said electronic circuitry is a Universal Integrated Circuit Cards (UICC) card reader.

9. A Home IMS Gateway according to claim 6, wherein said memory configured to store an ISIM application is a memory configured to store a soft ISIM.

* * * * *

UNITED STATES PATENT AND TRADEMARK OFFICE
CERTIFICATE OF CORRECTION

PATENT NO. : 8,160,578 B2  
APPLICATION NO. : 11/654695  
DATED : April 17, 2012  
INVENTOR(S) : Lindgren Page 1 of 1

It is certified that error appears in the above-identified patent and that said Letters Patent is hereby corrected as shown below:

In Column 5, Line 4, delete "User." and insert -- User --, therefor.

Signed and Sealed this  
Twenty-second Day of January, 2013

David J. Kappos  
*Director of the United States Patent and Trademark Office*